(12) United States Patent
Nishikawa et al.

(10) Patent No.: US 7,802,716 B2
(45) Date of Patent: Sep. 28, 2010

(54) METHOD OF MANUFACTURING HEAT EXCHANGER TUBE AND HEAT EXCHANGER

(75) Inventors: Hiroshi Nishikawa, Kariya (JP); Kenta Gotyo, Kariya (JP); Takashi Hattori, Kariya (JP); Masaki Kumagai, Tokyo (JP); Yasunaga Itoh, Tokyo (JP)

(73) Assignees: Denso Corporation, Aichi (JP); Sumitomo Light Metal Industries, Ltd., Tokyo (JP)

( * ) Notice: Subject to any disclaimer, the term of this patent is extended or adjusted under 35 U.S.C. 154(b) by 787 days.

(21) Appl. No.: 11/634,050

(22) Filed: Dec. 5, 2006

(65) Prior Publication Data

US 2007/0138237 A1 Jun. 21, 2007

(30) Foreign Application Priority Data

Dec. 15, 2005 (JP) ............................. 2005-361922

(51) Int. Cl.
*B23K 1/018* (2006.01)

(52) U.S. Cl. .................................... 228/183; 228/112.1
(58) Field of Classification Search ............. 228/112.1, 228/183
See application file for complete search history.

(56) References Cited

U.S. PATENT DOCUMENTS

| 4,207,662 A | * | 6/1980 | Takenaka ............... 29/890.047 |
| 4,433,227 A | * | 2/1984 | Brittin ........................ 219/615 |

* cited by examiner

*Primary Examiner*—Edward M Johnson
(74) *Attorney, Agent, or Firm*—Flynn, Thiel, Boutell & Tanis, P.C.

(57) ABSTRACT

The present invention provides a method of manufacturing a heat exchanger tube in which a tube for a heat exchanger formed by brazing is manufactured using a sheet material, wherein a filler metal melted during brazing can be prevented from entering an opening formed in an opposing portion or a parallel portion formed when bending a sheet material into a tube shape or an opening facing toward the outside of the tube. The opposing portion, the parallel portion, or the opening facing toward the outside of the tube is sealed. As the sealing means, friction welding is preferable.

19 Claims, 7 Drawing Sheets

US 7,802,716 B2

METHOD OF MANUFACTURING HEAT EXCHANGER TUBE AND HEAT EXCHANGER

BACKGROUND OF THE INVENTION

1. Field of the Invention

The present invention relates to a method of manufacturing a heat exchanger tube in which a tube for a heat exchanger formed by brazing is manufactured using a sheet material, and a heat exchanger in which a tube obtained by the manufacturing method is incorporated and integrated by brazing.

2. Description of Related Art

An extruded flat multi-channel tube has been used as a tube for automotive aluminum heat exchangers. In order to reduce the weight of heat exchangers, tubes obtained by forming a sheet material have been proposed. Examples of such tubes include tubes $1a$ and $1e$ shown in FIGS. 1 and 5 formed by bending an aluminum sheet material into a tube shape so that the end portions are oppositely positioned, tubes $1b$, $1c$, and $1f$ shown in FIGS. 2, 3, and 6 in which the end portions are disposed in parallel, a tube $1d$ shown in FIG. 4 in which the end portion and a portion other than the end portion are disposed in parallel, and the like.

Another example is an inner fin tube $1g$ shown in FIG. 7 formed by bending a sheet material (in particular aluminum sheet material) into a tube shape so that the end portions are disposed in parallel, inserting a corrugated fin 2 (in particular aluminum fin) into the tube shape so that the end portion of the fin 2 is placed between the end portions of the sheet material, and closing (hemming) the end portions to form an end portion G as a temporarily secured portion 3 (see JP-A-2003-336989, for example).

A heat exchanger is manufactured by stacking the tube $1a$, $1b$, $1c$, $1d$, $1e$, or $1f$ or the inner fin tube $1g$ and a corrugated fin, assembling a header (not shown), and integrating the components by brazing. When using the tube $1a$, $1b$, $1c$, $1d$, $1e$, or $1f$, a filler metal enters the tube through the opening formed in the opposing portion or the parallel portion or the opening facing toward the outside of the tube. When using the inner fin tube $1g$, a filler metal enters the tube through the gap in the temporarily secured portion 3 formed by closing the tube. As a result, the amount of filler metal becomes insufficient for the necessary portion, whereby insufficient brazing occurs. In particular, measures to solve this problem have been demanded when brazing an aluminum heat exchanger.

Specifically, a filler metal enters the tube $1a$ through an opening 11 in the opposing portion and an opening 13 facing toward the outside (portion A). A filler metal enters the tube $1b$ through an opening 12 in the parallel portion (portion B). A filler metal enters the tube $1c$ through an opening 12 in the parallel portion (portion C). A filler metal enters the tube $1d$ through an opening 12 in the parallel portion of the end portion and a portion other than the end portion and an opening 13 facing toward the outside (portion D). A filler metal enters the tube $1e$ through an opening 11 in the opposing portion (portion E). A filler metal enters the tube $1f$ through an opening 12 in the parallel portion (portion F).

SUMMARY OF THE INVENTION

As means for preventing entrance of a filler metal, when using the tube $1a$, $1b$, $1c$, $1d$, $1e$, or $1f$, the opening 11 in the opposing portion, the opening 12 in the parallel portion, or the opening 13 facing toward the outside of the tube may be sealed by welding before brazing. When using the inner fin tube $1g$, the opening in the end portion G (temporarily secured portion 3) may be sealed by welding before brazing. A complete joint is formed by known welding means which melts the above portion. However, it is difficult to control welding so that an appropriate joint is formed in such a thin portion. Moreover, a complicated instrument is required.

In recent years, friction stir welding (FSW) has been developed and expected to be applied in various fields. Therefore, a number of welding methods have been proposed. FSW is one type of solid-state welding method in which a hard tool is inserted into a soft metal such as aluminum and rotated therein to produce a plastic flow due to frictional heat, followed by stirring to effect welding. The inventors have attempted to seal the above portion by FSW. As a result, the inventors have found that a portion with a thickness of about 2 mm or more is necessary in order to obtain a strong junction without causing the matrix to buckle, and it is difficult to obtain a strong junction with a large junction depth for a portion with a small thickness.

On the other hand, the inventors have found that it suffices that these portions be welded to such an extent that these portions can withstand handling before brazing and thermal strain during brazing and a filler metal does not enter during brazing, and that a joint having such properties can be obtained even if the junction depth is small. Therefore, the inventors have found that FSW is also effective as means for welding these portions.

In order to obtain an easier welding method capable of forming a joint having the above properties, the inventors have conducted tests and examinations based on the idea of friction stir welding (FSW). The present invention has been achieved based on these tests and examinations. An object of the present invention is to provide a method of manufacturing a heat exchanger tube in which a tube for a heat exchanger formed by brazing is manufactured using a sheet material, wherein an opening formed in an opposing portion and a parallel portion formed when bending a sheet material into a tube shape and an opening facing toward the outside of the tube can be easily sealed by welding so that the tube has a sealed portion which can withstand handling before brazing and thermal strain during brazing and can prevent a filler metal from entering the tube during brazing, and a heat exchanger in which a tube obtained by the above manufacturing method is incorporated and integrated by brazing.

In order to achieve the above object, a first aspect of the present invention provides a method of manufacturing a heat exchanger tube in which a tube for a heat exchanger formed by brazing is manufactured using a sheet material, the method comprising: bending a sheet material into a tube shape while oppositely disposing end portions or disposing end portions or an end portion and a portion other than the end portion in parallel; and sealing an opening formed in the opposing portion or the parallel portion or an opening facing toward outside of the tube.

In this method of manufacturing a heat exchanger tube, the sheet material may be formed of aluminum.

In this method of manufacturing a heat exchanger tube, the parallel portion may be formed in three layers in which an end portion of an inner fin inserted into the tube is placed between the end portions disposed in parallel.

In this method of manufacturing a heat exchanger tube, the sheet material may be formed of copper.

In this method of manufacturing a heat exchanger tube, the sealing may be performed by friction welding.

In this method of manufacturing a heat exchanger tube, the sealing may be performed by friction stir welding.

In this method of manufacturing a heat exchanger tube, the friction welding may include restraining the opposing portion, the parallel portion, or the opening facing toward the outside of the tube, pressing a hard tool against the portion, relatively moving the portion and the hard tool to cause the hard tool to slide with respect to the portion, thereby causing frictional heat generation and a plastic flow to occur.

A second aspect of the present invention provides a heat exchanger manufactured by assembling a tube manufactured using the above method, a header, and a fin, and integrating the tube, the header, and the fin by brazing.

According to the present invention, a method of manufacturing a heat exchanger tube in which a tube for a heat exchanger formed by brazing is manufactured using a sheet material, wherein an opening formed in an opposing portion and a parallel portion formed when bending a sheet material into a tube shape and an opening facing toward the outside of the tube can be easily sealed by welding so that the tube has a joint which can withstand handling before brazing and thermal strain during brazing and can prevent a filler metal from entering the tube during brazing, and a heat exchanger in which a tube obtained by the above manufacturing method is incorporated and integrated by brazing can be provided. The method of manufacturing a heat exchanger tube according to the present invention is particularly suitably used when manufacturing a tube for an aluminum heat exchanger formed by brazing by bending an aluminum sheet material.

Other objects, features, and advantages of the present invention will hereinafter become more readily apparent from the following description.

DETAILED DESCRIPTION OF THE INVENTION AND PREFERRED EMBODIMENT

As the sealing method used in the method of manufacturing a heat exchanger tube according to the present invention, sealing by friction welding is most preferable. In friction welding, an opposing portion, a parallel portion, or an opening facing toward the outside of a tube formed by bending a sheet material, or an end portion G of an inner fin tube is restrained. A hard tool is pressed against the portion, and the portion and the hard tool are relatively moved to cause the hard tool to slide with respect to the portion. This causes frictional heat generation and a plastic flow to occur, whereby the opening 11 formed in the opposing portion, the opening 12 formed in the parallel portion, the opening 13 facing toward the outside of the tube, or the opening at the end portion G of the inner fin tube is welded and sealed.

In the method of manufacturing a heat exchanger tube according to the present invention, an aluminum sheet material or a copper sheet material may be applied as the sheet material. The thickness of the aluminum sheet material or the copper sheet material is 1 mm or less, preferably 0.05 to 0.5 mm, and still more preferably 0.05 to 0.2 mm.

Figure 6:
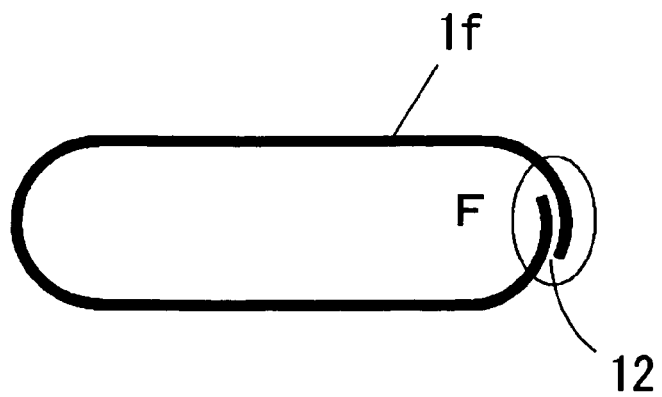
FIG. 6 is a side view showing yet another example of a tube formed by bending a sheet material.
Figure 7:
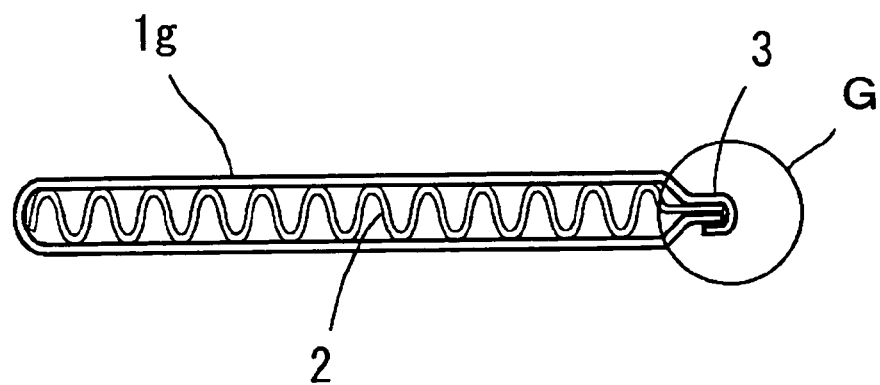
FIG. 7 is a side view showing an example of an inner fin tube.

The method is described below in detail with reference to the drawings. An example of sealing the end portion G of the inner fin tube by welding is described below. Note that the opening 12 in the parallel portion of the tube 1c shown in FIG. 3 may be welded in the same manner as the end portion G. The opening 13 of the tube 1a shown in FIG. 1, the opening 12 in the parallel portion of the tube 1b shown in FIG. 2, the opening 12 and the opening 13 in the parallel portion of the tube 1d shown in FIG. 4, or the opening 12 in the parallel portion of the tube 1f shown in FIG. 6 may be welded in the same manner as the end portion G by restraining the portion from the inside.

Figure 8:
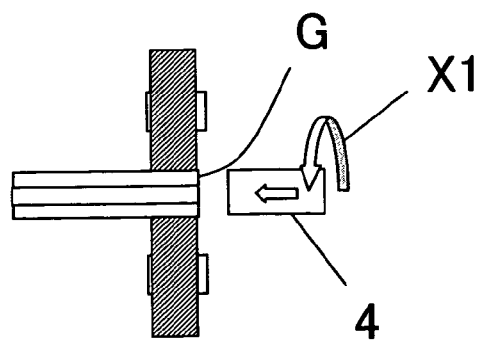
FIG. 8 is a side view showing an example of a junction configuration of an end portion of a sheet bent into a tube shape in the present invention.
Figure 9:
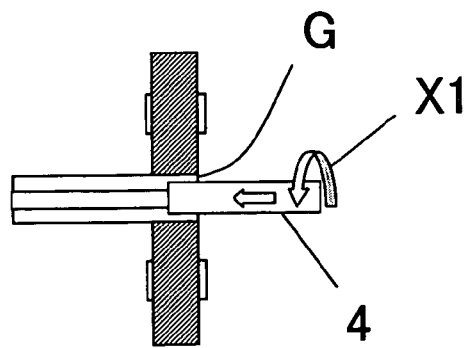
FIG. 9 is a side view showing another example.

In a first embodiment, as illustrated in FIGS. 8 to 9 showing the side surface of the end portion G, the end portion G is restrained from both sides, and a cylindrical hard tool 4 which rotates in a direction X1 is pressed against the side surface of the end portion. The hard tool 4 is caused to slide with respect to the width direction of the end portion G to cause frictional heat generation and a plastic flow to occur to effect welding. The hard tool 4 is moved along the width direction of the end portion G of the sheet material bent into a tube shape while being rotated to weld the end portion G over the entire width.

As shown in FIG. 9, when the diameter of the hard tool 4 is smaller than the total thickness of the end portion G, friction stir welding may be performed in which the hard tool is inserted into the end portion G by rotation and pressing, and is moved in the width direction while being rotated to cause a plastic flow to occur around the rotating tool 4, whereby the end portion G is welded to fill the path of the tool.

Figure 10:
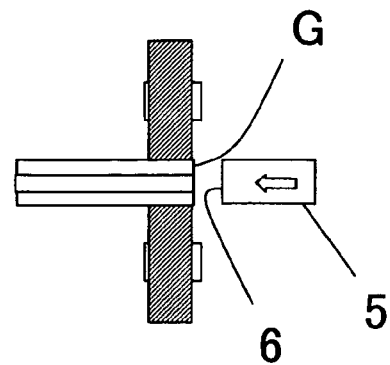
FIG. 10 is a side view showing yet another example.
Figure 11:
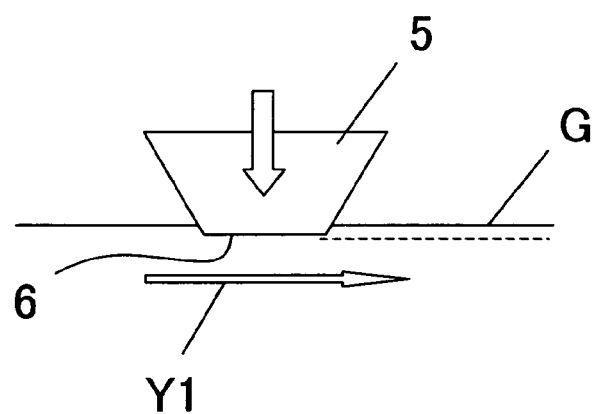
FIG. 11 is a partial plan view of FIG. 10.

In a second embodiment, as shown in FIGS. 10 to 11, the end portion G is restrained from both sides, and a spatula-shaped hard tool 5 is pressed against the end portion G The hard tool 5 or the end portion G is moved in a direction Y1 to cause the hard tool 5 to slide with respect to the end portion G. This causes frictional heat generation and a plastic flow to occur to effect welding. In this case, in order to prevent the plastically flowing matrix from forming a burr toward the outside, a lower end face 6 of the spatula-shaped hard tool 5 preferably has a shape which is internally depressed when viewed from the side surface, as indicated by 6A, 6B, and 6C in FIGS. 15 to 17. When the amount of protrusion of the end portion G is small in a state in which the end portion G is restrained from both sides using a roll or the like, the lower end face 6 of the hard tool 5 may have a convex shape, as indicated by 6D in FIG. 18.

Figure 15:
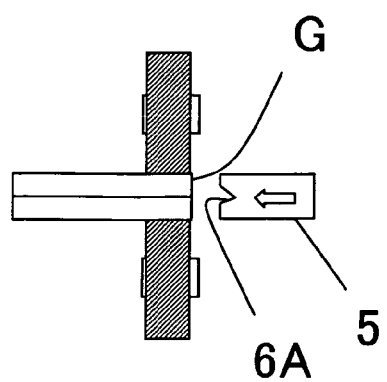
FIG. 15 is a side view showing an example of a lower end face of a hard tool 5 in FIGS. 10 and 11.
Figure 16:
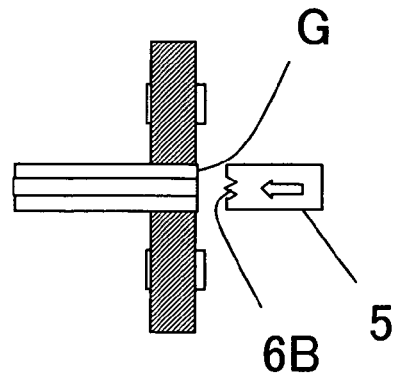
FIG. 16 is a side view showing another example of a lower end face of a hard tool 5 in FIGS. 10 and 11.
Figure 17:
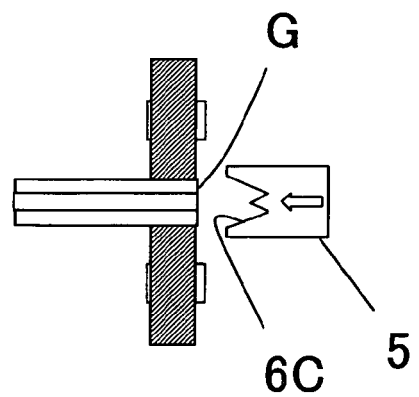
FIG. 17 is a side view showing another example of a lower end face of a hard tool 5 in FIGS. 10 and 11.
Figure 18:
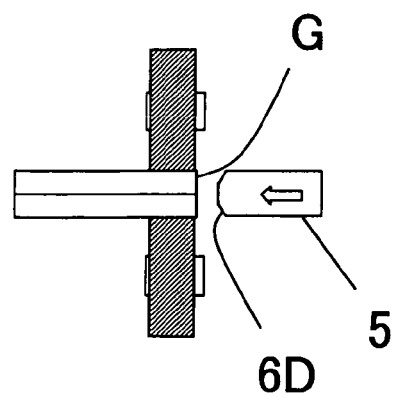
FIG. 18 is a side view showing yet another example of a lower end face of a hard tool 5 in FIGS. 10 and 11.

Since the edge portion of the aluminum sheet material forming the tube is cut using a slitter or the like, a depression may be formed in the end portions disposed in parallel. In this case, as shown in FIGS. 15 to 17, a hard tool is used in which a depression is formed by causing both sides of the lower end face to protrude with respect to the center portion so that the matrix is introduced into the depression, whereby a stable junction state without a gap can be obtained.

Figure 12:
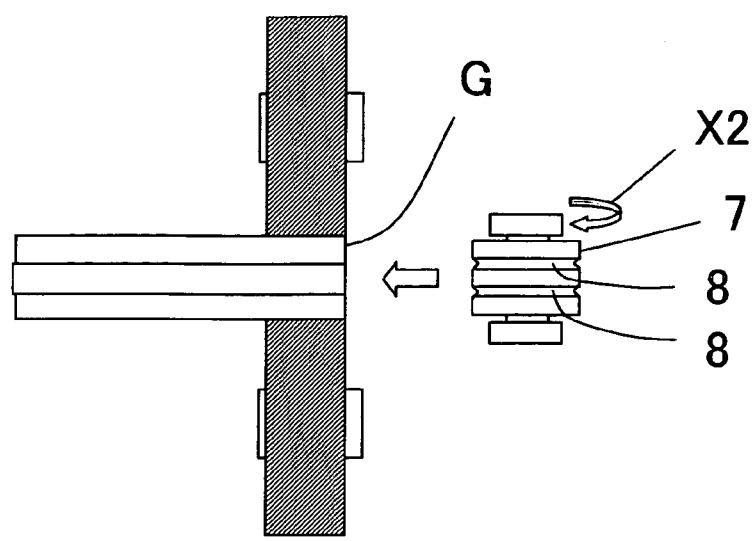
FIG. 12 is a side view showing another example of a junction configuration of an end portion of a sheet bent into a tube shape in the present invention.
Figure 13:
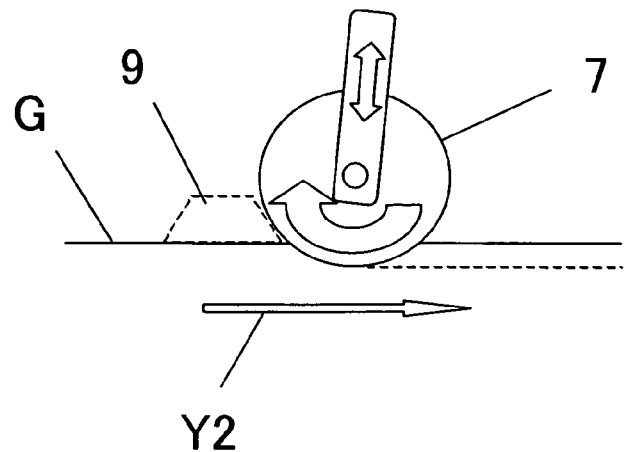
FIG. 13 is a partial plan view of FIG. 12.
Figure 14:
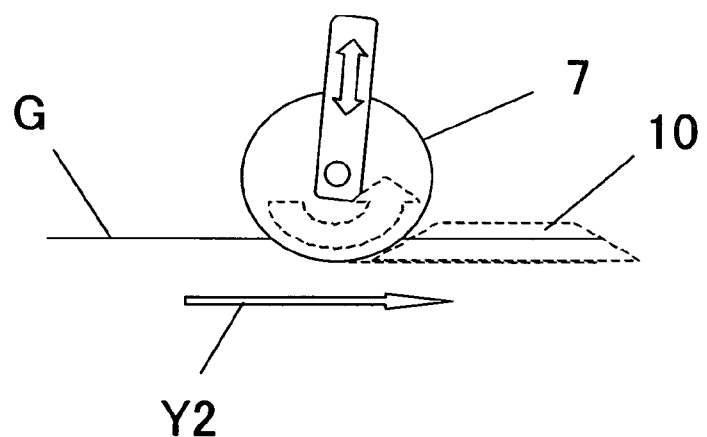
FIG. 14 is another partial plan view of FIG. 12.

In a third embodiment, a roller-shaped hard tool 7 may be used as the hard tool, as shown in FIGS. 12 to 14. FIG. 12 shows the side surface of the end portion G The roller-shaped hard tool 7 which rotates in a direction X2 is pressed in the direction indicated by the arrow in a state in which the end portion G is restrained from both sides, and is moved in the width direction of the end portion G The end portion G (matrix) to be welded may be moved relative to the hard tool 7. It is preferable that the roller-shaped hard tool 7 have grooves 8 in the circumferential direction, as shown in FIG. 12. This promotes frictional heat generation and a plastic flow due to partial pressing and sliding, whereby the junction state can be improved.

FIG. 13 shows an example in which frictional heat is generated by strongly rubbing the end portion G by rotating the hard tool 7 in the direction opposite to the direction Y2 in which the hard tool 7 is moved along the end portion G (or, rotating the hard tool 7 in the direction opposite to the moving direction of the end portion G (matrix)) to effect welding. A matrix 9 is discharged in front of the hard tool 7 to form a burr. However, formation of burrs is minimized by selecting the moving speed and the rotational speed, whereby a sound junction state is obtained. Moreover, a stable junction state is obtained by controlling the pressing force of the hard tool 7 at an appropriate value.

FIG. 14 shows an example in which frictional heat is generated by rotating the hard tool 7 in the same direction as the direction Y2 in which the hard tool 7 is moved along the end portion G (or, rotating the hard tool 7 in the same direction as the moving direction of the end portion G (matrix)) to effect welding. In this case, since a stirred matrix 10 is discharged behind the hard tool 7, it is preferable to apply a press jig (not shown) in order to prevent the matrix 10 from being discharged.

Figure 1:
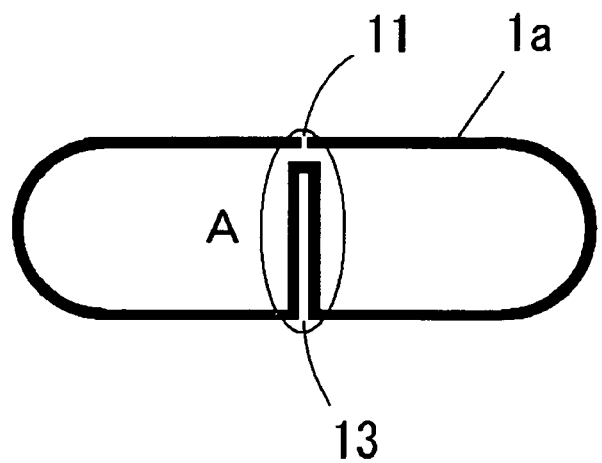
FIG. 1 is a side view showing an example of a tube formed by bending a sheet material.
Figure 2:
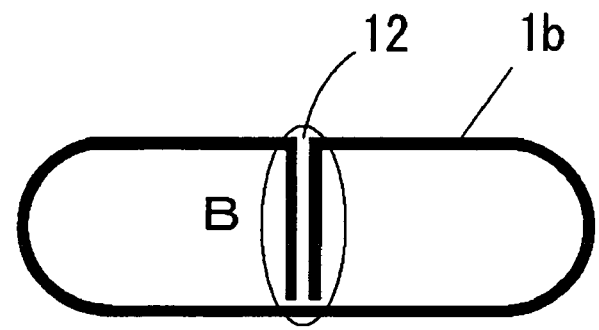
FIG. 2 is a side view showing another example of a tube formed by bending a sheet material.
Figure 5:
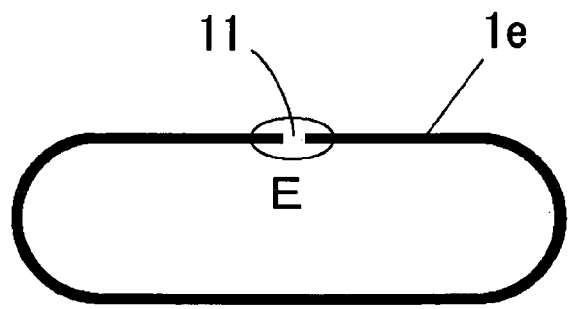
FIG. 5 is a side view showing another example of a tube formed by bending a sheet material.
Figure 19:
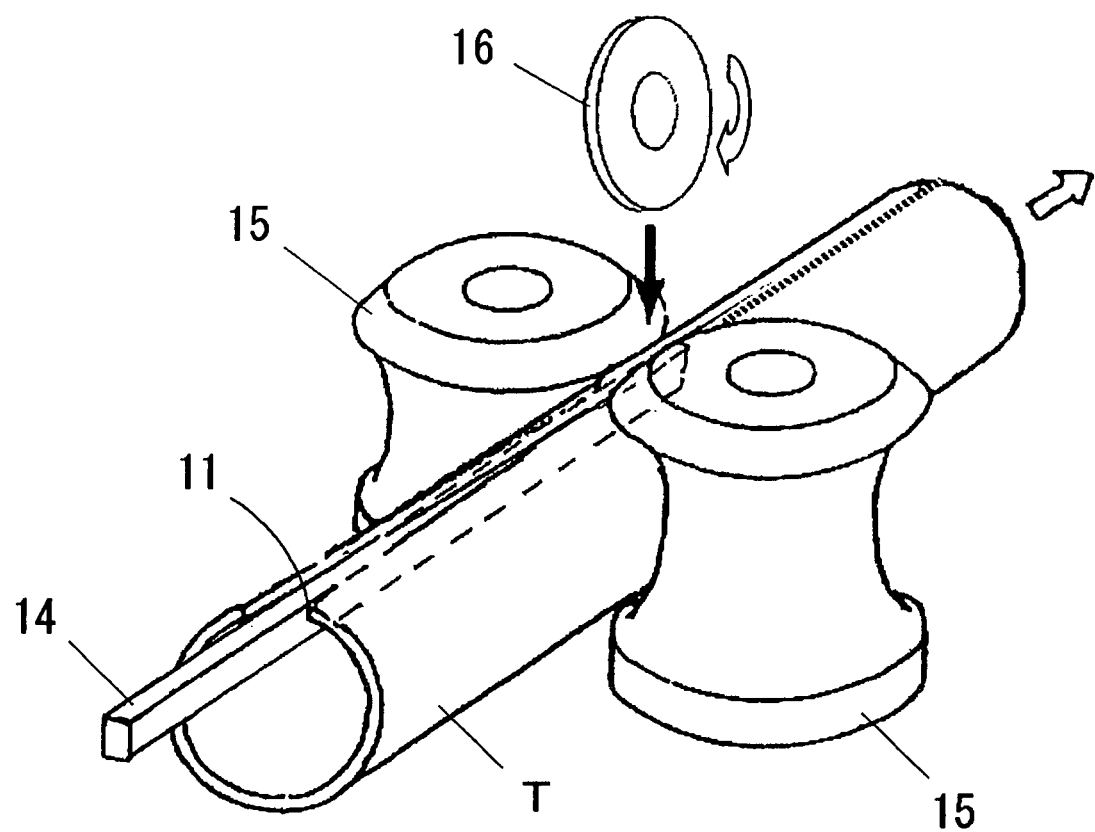
FIG. 19 is a partial perspective view showing an example of an opposing portion bent into a tube shape in the present invention.

A fourth embodiment is an example in which the opening formed in the opposing portion such as the opposing portion of the tube 1a shown in FIG. 1 or the opposing portion of the tube 1e shown in FIG. 5 is welded. As shown in FIG. 19, the opposing portion of the tube (circular tube in FIG. 19) T is restrained by providing a backing jig 14 from the inside and providing forming rollers 15 from the outside. A hard roller 16 which rotates in the direction of the arrow is pressed against the restrained opposing portion. The opposing portion (opening 11 in the opposing portion) to be welded is moved relative to the hard roller 16 using the forming rollers 15 to promote frictional heat generation and a plastic flow due to partial pressing and sliding, whereby the opening 11 in the opposing portion is welded. After welding, the tube T may be subjected to roll forming into a cross-sectional shape as shown in FIG. 5.

In the above friction welding and friction stir welding, the junction depth is set at 0.5 mm or less, and preferably 0.3 mm or less. Friction welding is a method in which a plastic flow is caused to occur in a minute portion due to frictional heat generation. A sufficient frictional heat generation to cause a plastic flow to occur may not be obtained when welding at high speed, for example. In this case, it is preferable to preheat the weld target portion. As the preheating method, a method of heating the weld target end portion by high frequency induction heating, arc heating, laser heating, resistance heating, or the like can be given. The weld target portion is preheated to a temperature of 50 to 90% of the melting point of the weld target portion. As the preheating atmosphere, an inert atmosphere is preferable. It is effective to weld the opposing portion, the parallel portion, or the like utilizing friction welding or friction stir welding when applying an aluminum sheet material as the sheet material.

Friction welding and friction stir welding have been described above as the sealing means by preferable welding in the present invention. It is also possible to apply known welding means under sufficiently controlled conditions.

EXAMPLES

Examples according to the present invention are described below to demonstrate the effects of the present invention. Not that the following examples illustrate one aspect of the present invention, and should not be construed as limiting the present invention.

Example 1

Figure 3:
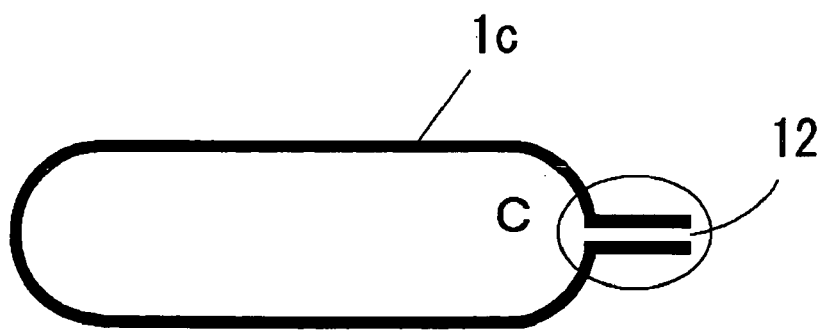
FIG. 3 is a side view showing another example of a tube formed by bending a sheet material.
Figure 4:
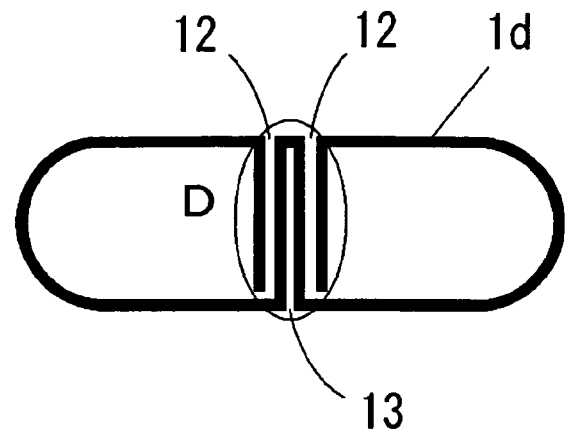
FIG. 4 is a side view showing another example of a tube formed by bending a sheet material.

An Al—Mn aluminum alloy sheet (thickness: 0.2 mm) in which a sacrificial anode material Al—Zn alloy was clad on its outer surface was bent into a flat tube shape as shown in FIG. 3, and a parallel portion of the end portions was formed. An inner fin (thickness: 0.1 mm) formed of a corrugated Al—Mn aluminum alloy (Al—Si alloy filler metal was clad on both sides) was inserted into the flat tube. The end portion of the inner fin was placed between the aluminum alloy sheet portions forming the parallel portion to form an end portion in which the three portions were stacked.

The parallel portion and the end portion in which the three portions were stacked were restrained using steel plates with a thickness of 5 mm. A cylindrical steel rotating tool with a diameter of 0.5 mm was pressed against the side surfaces of the parallel portion and the end portion while rotating the tool at a rotational speed of 1500 rpm. The tool was moved in the longitudinal direction (width direction of the flat tube) at a speed of 8 m/min to cause frictional heat generation to occur due to sliding, thereby welding the end portion.

The resulting tube and inner fin tube were inserted into a header tube, and subjected to Nocolok brazing (brazing using fluoride flux) in which the tube was heated at a temperature of about 600° C. for three minutes. As a result, the filler metal did not enter the joint during brazing, and the amount of filler metal for the header tube did not become insufficient, whereby sound brazing could be performed.

Example 2

An Al—Mn aluminum alloy sheet (thickness: 0.2 mm) in which a sacrificial anode material Al—Zn alloy was clad on its outer surface was bent into a flat tube shape as shown in FIG. 5, and an opposing portion of the end portions was formed.

As shown in FIG. 19, the opposing portion was restrained using a steel backing jig and forming rollers. A disk-shaped steel roller with a diameter of 200 mm and a width of 0.5 mm was pressed against the opposing portion while rotating the roller at a rotational speed of 3000 rpm. The opposing portion was moved at a speed of 100 m/min to cause frictional heat generation to occur due to sliding, thereby welding the opening in the opposing portion.

The resulting tube was inserted into a header tube, and subjected to Nocolok brazing (brazing using fluoride flux) in which the tube was heated at a temperature of about 600° C. for three minutes. As a result, the filler metal did not enter the joint during brazing, and the amount of filler metal for the header tube did not become insufficient, whereby sound brazing could be performed.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of manufacturing a tube for a heat exchanger formed by brazing, said method comprising:
   providing a sheet material of aluminum or aluminum alloy and having first and second end portions;
   bending the sheet material into a tube so that the first end portion thereof is disposed in one of: a) butting relationship with the second end portion of the sheet material to form an opening therebetween; b) overlapping relationship with the second end portion of the sheet material to form an opening therebetween; and c) overlapping relationship with a further portion of the sheet material other than the second end portion to form an opening therebetween; and
   sealing the opening in the tube by friction welding.

2. The method of claim 1, wherein the opening is a first opening, said method further including bending the sheet material to form a second opening in the tube which faces towards an outside of the tube, and sealing the second opening by friction welding.

3. The method of claim 1, wherein said step of bending the sheet material comprises disposing the first end portion in overlapping relationship with the second end portion, said method further including inserting an inner fin into the tube so that an end portion of the inner fin is disposed between the first and second end portions to form a three-layer overlapping construction.

4. The method of claim 1, wherein the step of bending the sheet material into a tube comprises disposing the first end portion in butting relationship with the second end portion, the step of sealing the opening in the tube by friction welding includes restraining the first and second end portions, pressing a hard tool against the restrained end portions, and moving the hard tool and the tube relative to one another to cause the hard tool to slide relative to the tube, thereby causing frictional heat generation and plastic flow to occur to seal the opening.

5. The method of claim 1, wherein the step of bending the sheet material into a tube comprises disposing the first end portion in overlapping relationship with the second end portion, the step of sealing the opening in the tube by friction welding includes restraining the first and second end portions, pressing a hard tool against the restrained end portions, and moving the hard tool and the tube relative to one another to cause the hard tool to slide relative to the tube, thereby causing frictional heat generation and plastic flow to occur to seal the opening.

6. The method of claim 1, wherein the step of bending the sheet material into a tube comprises disposing the first end portion in overlapping relationship with the further portion, the step of sealing the opening in the tube by friction welding includes restraining the first end portion and the further portion, pressing a hard tool against the restrained portions, and moving the hard tool and the tube relative to one another to cause the hard tool to slide relative to the tube, thereby causing frictional heat generation and plastic flow to occur to seal the opening.

7. A heat exchanger incorporating a tube made according to the method of claim 3, the heat exchanger including a header and a fin, wherein the tube, the header and the fin are integrated with one another by brazing.

8. A heat exchanger incorporating a tube made according to the method of claim 1, the heat exchanger including a header and a fin, wherein the tube, the header and the fin are integrated with one another by brazing.

9. A method of manufacturing a tube for a heat exchanger formed by brazing, said method comprising:
   providing a sheet material of aluminum or aluminum alloy and having first and second end portions;
   bending the sheet material into a tube so that the first end portion thereof is disposed in one of: a) butting relationship with the second end portion of the sheet material to form an opening therebetween; b) overlapping relationship with the second end portion of the sheet material to form an opening therebetween; and c) overlapping relationship with a further portion of the sheet material other than the second end portion of the sheet material to form an opening therebetween; and
   sealing the opening in the tube by friction stir welding.

10. The method of claim 9, wherein the opening is a first opening, said method further including bending the sheet material to form a second opening in the tube which faces towards an outside of the tube, and sealing the second opening by friction stir welding.

11. The method of claim 9, wherein said step of bending the sheet material comprises disposing the first end portion in overlapping relationship with the second end portion, said method further including inserting an inner fin into the tube so that an end portion of the inner fin is disposed between the first and second end portions to form a three-layer overlapping construction.

12. A heat exchanger incorporating a tube made according to the method of claim 9, the heat exchanger including a header and a fin, wherein the tube, the header and the fin are integrated with one another by brazing.

13. A method of manufacturing a tube for a heat exchanger formed by brazing, said method comprising:
   providing a metal sheet material having first and second end portions defining thereon respective terminal edges of the sheet;
   bending the sheet material into a tube so that the first and second end portions are disposed in opposed and spaced relationship with one another such that an opening is located between the first and second end portions; and
   sealing the opening in the tube by friction welding prior to a brazing operation performed during assembly of a heat exchanger into which the tube is incorporated.

14. The method of claim 13, wherein the opening is a first opening, the method further including bending the sheet material inwardly to form a second opening in the tube which opens outwardly, and the step of sealing includes sealing the second opening by friction welding prior to a brazing operation performed during assembly of a heat exchanger into which the tube is incorporated.

15. The method of claim 14, wherein the step of bending the sheet material inwardly to form the second opening includes forming the second opening between opposed parts of the sheet material so that the second opening opens outwardly on a side of the tube opposite the first opening.

16. The method of claim 14, wherein the step of bending the sheet material inwardly to form the second opening includes forming the second opening between opposed parts of the sheet material so that the second opening opens outwardly on a side of the tube opposite the first opening, the opposed parts of the sheet material being disposed between and in generally parallel relation with the first and second end portions, the first opening being a pair of openings wherein one of the first openings is defined between the first end portion and one of opposed parts and the other of the first openings is defined between the second end portion and the other of the opposed parts.

17. The method of claim 13, wherein the step of bending the sheet material includes bending the sheet material so that the terminal edges of the respective first and second end portions of the sheet are disposed in butting relationship with the opening being defined between the terminal edges.

18. The method of claim 13, wherein the step of bending the sheet material includes bending the sheet material so that the first and second end portions are disposed in superimposed and overlapping relationship with one another with the opening being defined between the first and second end portions.

19. A heat exchanger incorporating a tube made according to the method of claim 13, the heat exchanger including a header and a fin, wherein the tube, the header and the fin are interconnected to one another by brazing after the step of sealing.

* * * * *